United States Patent [19]

Wallace

[11] Patent Number: 5,132,353
[45] Date of Patent: Jul. 21, 1992

[54] MOLDING COMPOSITION

[75] Inventor: Lawrence R. Wallace, Evansville, Ind.

[73] Assignee: General Electric Company, Pittsfield, Mass.

[21] Appl. No.: 424,653

[22] Filed: Oct. 20, 1989

[51] Int. Cl.[5] .............................. C08K 3/22
[52] U.S. Cl. ................... 524/432; 524/539; 525/444
[58] Field of Search .............. 524/432, 539; 525/444

[56] References Cited

U.S. PATENT DOCUMENTS

| | | | |
|---|---|---|---|
| 3,764,576 | 10/1973 | Russo | 260/40 R |
| 3,923,728 | 12/1975 | Seydl | 524/432 |
| 3,953,394 | 4/1976 | Fox et al. | 260/40 R |
| 4,043,971 | 8/1977 | Wurmb et al. | 260/40 R |
| 4,444,931 | 4/1984 | Lu et al. | 524/227 |
| 4,460,731 | 7/1984 | Kochanowski et al. | 524/539 |
| 4,672,086 | 6/1987 | Seiler et al. | 524/539 |
| 4,689,365 | 8/1987 | Chacko et al. | 524/539 |

FOREIGN PATENT DOCUMENTS 60-231763  11/1985  Japan.
62-252460  11/1987  Japan.

OTHER PUBLICATIONS

Catalog of Rhein Chemie Corporation.

Primary Examiner—John C. Bleutge
Assistant Examiner—Karen A. Hellender
Attorney, Agent, or Firm—James V. Costigan

[57] ABSTRACT

A novel molding composition is disclosed which comprises polybutylene terephthalate, polyethylene terephthalate, and 20-85% of zinc oxide by total weight of said molding composition.

24 Claims, No Drawings

MOLDING COMPOSITION

BACKGROUND OF THE INVENTION

Compositions which contain polybutylene terephthalate and polyethylene terephthalate with fillers are described in U.S. Pat. No. 3,953,394. When compositions which contain polyethylene terephthalate resin and polybutylene terephthalate resin are melt blended with high levels of zinc oxide, a dense, ceramic-like molded article can be obtained. When compositions of either polyethylene terephthalate resin and zinc oxide or polybutylene terephthalate resin and zinc oxide are melt blended, the resin will exhibit a significant decrease in melt viscosity. The decrease in melt viscosity makes it very difficult to process the combination of the resin and zinc oxide, because the resin component is degraded. It has been found that compositions of polybutylene terephthalate, polyethylene terephthalate and zinc oxide may be prepared by melt blending without significantly depressing the melt viscosity of the resins. The melt viscosity is related to the molecular weight and the wet out of the filler. When the melt viscosity is not depressed by processing, the physical properties of molded articles will be improved as compared to test samples having a lower melt viscosity. This fact permits the use of melt blending to prepare compositions of polybutylene terephthalate, polyethylene terephthalate and zinc oxide which have good properties. It has also been found that very high levels of zinc oxide may be incorporated into a blend of polyethylene terephthalate and polybutylene terephthalate to form a highly dense composition having good surface properties.

The invention also provides a method of imparting stain resistance to a polybutylene terephthate-zinc oxide composition which is based on the addition of polyethylene terephthalate resin to said composition.

The highly loaded zinc oxide composition of the invention may be used for molding ceramic-like objects such as tableware, including dishes, bowls, mugs, and the like. It may also be used as a substitute for containers made of opaque glass or for molding billiard balls, poker chips and ceramic-like tiles. Containers made according to the invention can be used in contact with foods. The containers pass a standard FDA required test for metal extractables.

In addition, the addition of polyethylene terephthalate to a composition of polybutylene terephthalate and zinc oxide will improve the gloss of the surface.

Compositions of the invention have improved impact strength as compared to compositions that do not have a combination of polybutylene terephthalate and polyethylene terephthalate.

Accordingly, it is an object of the invention to provide a molding composition which contains high levels of zinc oxide which when molded will have a smooth and glossy surface.

It is also an object of the invention to provide novel molding compositions which have a ceramic-like feel and density.

It is also an object of the invention to provide novel molding compositions which have a special utility for molding molded articles such as tableware.

It is also an object of the invention to provide novel molding compositions which have a special utility for use as a substitute for opaque glass.

These and other objects will become apparent from the present specification.

SUMMARY OF THE INVENTION

The present invention is concerned with a molding composition of a polybutylene terephthalate resin; a polyethylene terephthalate resin; and 20-85% by weight of zinc oxide based on the total weight of said molding composition.

The polybutylene terephthalate resin may comprise from 5-75% or 5-65% by total weight of composition; the polyethylene terephthalate may comprise from 5-75% or 5-65% by total weight of composition and the zinc oxide may comprise from 20-85% by weight of the total weight of composition.

DETAILED DESCRIPTION OF THE INVENTION

The preferred polybutylene terephthalate will have an intrinsic viscosity of about 0.78 dl/g as measured in a 60:40 mixture of phenol and tetrachloroethane at 25° C., but polybutylene terephthalate with an intrinsic viscosity of 0.4-1.5 dl/g as measured under the stated conditions may be used. The term polybutylene terephthalate includes branched polybutylene terephthalate which includes a branching agent. See for example U.S. Pat. Nos. 3,953,404; 4,788,251 and 4,141,882, which are incorporated by reference. The preferred polyethylene terephthalate may have an intrinsic viscosity of 0.62 dl/g as measured in a 60:40 mixture of phenol and tetrachloroethane at 25° C., but polyethylene terephthalate having an intrinsic viscosity of 0.3-1.1 dl/g as measured under the stated conditions may be employed. The polyethylene terephthalate may be modified with a minor amount of a glycol, e.g. from 0.05-5% of ethylene glycol, diethylene glycol, butane diol, hexane diol, cyclohexyl dimethanol or the like. The molecular weight of the resin component is not critical and resins of varying molecular weight may be employed.

The zinc oxide may be in the form of zincite or as synthetically produced white zinc oxide produced by the indirect French process using zinc metal or metallic residues, or the American process using zinc residues, or by a wet chemical process. A finely divided form is preferred which has an average particle diameter of 0.05-50 microns, or 0.01-50 microns preferably 0.1-5 microns and most preferably about 1.5 microns.

In most applications, it will be preferred to use zinc oxide as 100% of the total filler present. It is within the scope of the invention to replace less than 50% by weight of the total zinc oxide content and preferably up to 15% by weight with an inorganic filler selected from the group consisting of alumina, amorphous silica, anhydrous aluminum silicates, barium ferrite, barium sulfate, calcium carbonate, mica, feldspar, clays such as kaolin, talc, magnesium oxide, magnesium silicate, nepheline syenite, phenolic resins, glass microspheres, wollastonite, titanium dioxide, zirconium oxide, ground quartz, and the like.

The molding compositions of the invention may include polybutylene terephthalate, polyethylene terephthalate and 20-85%; 50-70% 50-75% and preferably about 55-65% of zinc oxide by weight based on the total weight of said molding composition. Preferred compositions include 5-40% by weight based on the total weight of composition of polybutylene terephthalate; 5-40% by weight based on the total weight of composition of polyethylene terephthalate and 55-65% of zinc oxide by weight based on the total weight of composition; and from 0.01 to 0.5% by weight of total composition of an phenolic antioxidant or antioxidant.

The preferred compositions are highly dense and have a density of above 2.0 and preferably above 2.3.

A preferred weight ratio of 0.2:1 to 5:1 of polybutylene terephthalate to polyethylene terephthalate may be employed.

The external lubricants function as mold release agents may be used at a level of 0.01-5% preferably 0.1-0.5% by weight of total composition. These materials will include compounds having a long non-polar backbone such as a carbon chain of 12-60 carbons. Examples include fatty acids; various esters including fatty esters, wax esters, glycerol esters, glycol esters, fatty alcohol esters, fatty alcohols, fatty amides, metallic stearates; and waxes. These materials are described in Modern Plastics Encyclopedia, 1988 Edition, p. 162, which is incorporated by reference.

The additive pentaerythritol tetrastearate is a dispersing agent for the zinc oxide. This results in improved ductility as illustrated by unnotched Izod results.

Flame retardants may be added in effective amounts for molding articles such as wastepaper baskets, which should be flame retardant. Suitable flame retardant agents are disclosed in U.S. Pat. Nos. 4,786,692; 3,334,154 and 4,020,124, which are incorporated by reference.

Other additive polymers may be added to the blend of polybutylene terephthalate and polyethylene terephthalate in amounts which are less than 50% by weight of the total amount of polybutylene terephthalate and polyethylene terephthalate resins. These polymers may be utilized alone or in combination at levels which are compatible with the composition of the polybutylene terephthalate, polyethylene terephthalate and zinc oxide. Generally, it will be preferred to limits the amount of the additive to less than 30% by weight of total resins and most preferably about 10% by weight of total resins. Suitable thermoplastic polymer resins include polycyclohexyl terephthalate and copolymers thereof; polyolefins such as high density polyethylene, (d=above 0.94) low density polyethylene (d=about 0.92) linear low density polyethylene (d=0.916-0.940) or polypropylene; EPDM; ethylene-vinyl acetate copolymers; EEA; polycarbonate; polystyrene; high impact polystyrenes; polyetherimides; polyetherimide esters; polyarylates; polymethyl pentene; polyamideimides; modified polyphenylene ethers; nylons; engineering TPEs; olefin TPEs and polyurethane TPEs; elastomeric alloy TPEs; acrylics; methacrylics; thermoplastic elastomers such as AB block copolymers; olefin modified SAN: ASA; ABS; SAN; SMA and the like. These materials are well known and are described in Modern Plastics Encyclopedia, 1988 Edition, pp. 1-109, which is incorporated by reference. The polyetherimide esters are described in U.S. Pat. No. 4,544,734 and the polyether imides are disclosed in U.S. Pat. No. 4,510,289, both of which are incorporated by reference.

The ASA polymers are disclosed in U.S. Pat. No. 3,944,631, which is incorporated by reference.

Suitable antioxidants may be included in the compositions. These antioxidants include phosphites the hindered phenols and other well known antioxidants such as secondary amines, thioesters, which may be added in effective amounts to retard oxidative degradation. The preferred antioxidant is tetrakis-(methylene-3(3',5'-di-tert-butyl-4-hydroxyphenyl)propionate)methane.

The composition may be prepared by tumble blending the powdered components, extruding and chopping the extrudate to form pellets. The pellets may be fabricated into useful articles by injection molding, compression molding, thermoforming, sheet extrusion and the like.

It is preferred to use a devolatilizing extruder although other types of mixing equipment may be employed.

When molding the composition of the invention, the surface properties can be optimized by increasing the mold or melt temperature, e.g. mold temperature of 120°-240° F. and melt temperature from 510°-530° F. The molecular weight of particular polymers may require different temperatures for optimum surface properties.

If desired, fiberglass reinforcing fillers may be added as well as pigments, ultraviolet stabilizers, impact modifiers, metal additives for electromagnetic radiation shielding such as nickel coated graphite fibers, antistatic agents, coupling agents such as amino silanes and the like.

If a fiberglass reinforcing filler is used, a level of 1-45% by weight of total composition may be employed or preferably 5-20% by weight of total compositions.

Materials suitable for use as impact modifiers include SBR, AB and ABA block copolymers such as Kraton or Kraton G; styrene-butadiene modified acrylics; acrylic modifiers such as EXL 2330; EVA and EEA polymers; core shell acrylics such as EXL 2691. These and other impact modifiers are described in U.S. Pat. Nos. 4,034,013; 4,096,202 and 4,180,494 and in Modern Plastics Encyclopedia, 1988 Edition, p. 160, which are incorporated by reference. Effective amounts range from 1-20% by total weight of composition.

DESCRIPTION OF THE PREFERRED EMBODIMENTS

Example 1

Compositions having the following components are prepared by tumble blending the components, extrusion through a 2½" extruder, single screw, HPM devolatilizing extruder. The compositions are dried and molded on a 80 TON, 3½ ounce barrel, Van Dorn injection molding machine, with a melt temperature of 500° F., and a mold temperature of 150° F., and a 31 second overall cycle time.

|  | 1 | 1A | 1B | 1C |
|---|---|---|---|---|
| Polybutylene terephthalate[1] | 29.4 | 19.5 | 9.5 | 0.0 |
| Polyethylene terephthalate[2] | 0.0 | 10.0 | 20.0 | 29.5 |
| Zinc Oxide | 63.4 | 63.4 | 63.4 | 63.4 |
| Fiberglass | 7.0 | 7.0 | 7.0 | 7.0 |
| Antioxidant[3] | 0.1 | 0.1 | 0.1 | 0.1 |
| Melt Viscosity @ 510° F.; Poise | | | | |
| pellets: | 1658 | 3845 | 4121 | 3227 |
| molded parts: | 167 | 2186 | 1357 | 679 |

-continued

|  | 1 | 1A | 1B | 1C |
|---|---|---|---|---|
| % Retention (of Melt Visc.) | 10.1 | 56.9 | 32.9 | 21.0 |
| Izod Impact, Unnotched (Ft. Lbs./In.) | 4.2 | 6.0 | 6.8 | 4.9 |
| Tensile Strength (psi) | 7960 | 9460 | 11050 | 9660 |
| Flexural Strength (psi) | 14040 | 15150 | 20140 | 18070 |
| Flexural Modulus (psi) | 1155000 | 1304000 | 1276000 | 988500 |
| Specific Gravity | 2.67 | 2.68 | 2.70 | 2.73 |

[1] The polybutylene terephthalate has an IV of 0.78 dl/g as measured in a 60:40 mixture of phenol and tetrachloroethane at 25° C.
[2] The polyethylene terephthalate has an IV of 0.62 dl/g as measured in a 60:40 mixture of phenol and tetrachloroethane at 25° C.
[3] Irganox 1010-tetrakis(methylene-3(3,'5'-di-tert-butyl-4-hydroxyphenyl)propionate)methane.

A surprising effect is shown in runs 1A and 1B as compared to 1 and 1C where the % retention of melt viscosity is improved.

Example 2

|  | 2 | 2A | Comparative A |
|---|---|---|---|
| Polybutylene terephthalate | 19.5 | 9.5 | 0 |
| Polyethylene terephthalate | 10.0 | 20.0 | 29.5 |
| Zinc oxide | 63.4 | 63.4 | 63.4 |
| Fiberglass | 7.0 | 7.0 | 7.0 |
| Antioxidant (Irganox 1010) | 0.1 | 0.1 | 0.1 |
| Pentaerythritol tetrastearate | 0.3 | 0.3 | 0.3 |
| Melt Viscosity @ 510° F.: Poise |  |  |  |
| pellets: | 2674 | 2983 | 4498 |
| molded parts: | 2061 | 1282 | 1307 |
| % Retention (of Melt Visc.) | 44.1 | 25.7 | 29.1 |
| Izod Impact: Unnotched (Ft. Lbs./in.) | 8.0 | 7.0 | 6.1 |
| Tensile strength (psi) | 10090 | 10580 | 11388 |
| Flexural strength (psi) | 16250 | 20080 | 20640 |
| Flexural Modulus (psi) | 1201000 | 1300000 | 1282000 |
| Specific Gravity | 2.64 | 2.71 | 2.72 |

The data shows that the presence of the pentaerythritol tetrasterate has an adverse effect on the melt viscosity stability of runs 2 and 2A.

All the compositions disclosed in Examples 1 and 2 are weight percent.

I claim:

1. A molding composition which comprises:
   (a) polybutylene terephthalate resin;
   (b) polyethylene terephthalate resin; and
   (c) from 50-75% by total weight of said molding composition of zinc oxide.

2. A molding composition as defined in claim 1, which includes from 55-65% by weight of zinc oxide.

3. A molding composition as defined in claim 1, wherein the average particle size of the zinc oxide is from 0.01-50 microns.

4. A molding composition as defined in claim 1, which includes an external lubricant.

5. A molding composition as defined in claim 1, which includes less than 30% by weight of total resins of an additive polymer.

6. A molding composition as defined in claim 4, which includes an antioxidant.

7. A molding composition as defined in claim 1, which contains 5-65% polybutylene terephthalate and 5-65% polyethylene terephthalate.

8. A molding composition which consists essentially of:
   (a) from 5-40% by total weight of composition polybutylene terephthalate;
   (b) from 5-40% by total weight of composition of polyethylene terephthalate;
   (c) from 0.01 to 0.5% by total weight of composition of a phenolic antioxidant; and
   (d) from 55-65% by weight of zinc oxide.

9. A molding composition as defined in claim 8, wherein the external lubricant is pentaerythritol tetrastearate.

10. A molding composition as defined in claim 9, wherein the antioxidant is tetrakis(methylene-3(3',5'-di-tert-butyl-4-hydroxyphenyl)propionate)methane.

11. A molding composition as defined in claim 1, which includes a flame retardant amount of a flame retardant.

12. A molding composition as defined in claim 8, which includes a flame retardant amount of a flame retardant.

13. An article which is molded from the composition of claim 1.

14. An article which is molded from the composition of claim 8.

15. A method of imparting stain resistance to a polybutylene terephthalate-zinc oxide composition which comprises adding to said composition an effective amount of polyethylene terephthalate.

16. A molding composition as defined in claim 1, wherein less than 50% by weight of the zinc oxide is replaced with an inorganic filler.

17. A molding composition as defined in claim 1, which includes an impact modifier.

18. A molding composition as defined in claim 1, which includes from 1-45% by weight of total composition of fiberglass.

19. A ceramic like molding composition which consists essentially of:
   (a) polybutylene terephthalate;

(b) polyethylene terephthalate; and
(c) from 50–75% by total weight of said molding composition of zinc oxide.

20. A ceramic like molding composition which consists of:
   (a) polybutylene terephthalate;
   (b) polyethylene terephthalate;
   (c) an external lubricant;
   (d) an antioxidant; and
   (e) from 50–75% by total weight of said composition of zinc oxide.

21. A molding composition for making ceramic like articles which comprises:
   (a) polybutylene terephthalate resin;
   (b) polyethylene terephthalate resin; and
   (c) from 50–75% by total weight of said molding composition of zinc oxide.

22. A molding composition for making ceramic like articles which consists essentially of:
   (a) polybutylene terephthalate resin;
   (b) polybutylene terephthalate resin; and
   (c) from 50–85% by total weight of said composition of zinc oxide.

23. A ceramic like molded article which is made from the composition of claim 21.

24. A ceramic like molded article which is made from the composition of claim 22.

* * * * *